United States Patent [19]

Plate et al.

[11] 4,279,334

[45] Jul. 21, 1981

[54] MECHANICAL DETENT FOR THREE SPEED POWER SHIFT TRANSMISSION

[75] Inventors: John R. Plate; James H. Lucas, both of Milwaukee, Wis.

[73] Assignee: Allis-Chalmers Corporation, Milwaukee, Wis.

[21] Appl. No.: 64,098

[22] Filed: Aug. 6, 1979

[51] Int. Cl.³ .................... B60K 41/24; F16D 67/04
[52] U.S. Cl. ................... 192/3.57; 192/4 A; 192/13 R; 251/297; 137/625.69
[58] Field of Search ............. 192/3.57, 4 A, 3.55, 192/3.54, 4 R, 13 A, 13 R; 251/297; 137/625.69; 74/474

[56] References Cited

U.S. PATENT DOCUMENTS

| | | | |
|---|---|---|---|
| 3,790,125 | 2/1974 | Swatty | 251/297 X |
| 4,006,805 | 2/1977 | Zeller et al. | 192/4 A |
| 4,151,861 | 5/1979 | Bohrdt et al. | 251/297 X |

*Primary Examiner*—George H. Krizmanich
*Attorney, Agent, or Firm*—Arthur L. Nelson

[57] ABSTRACT

A mechanical detent release for a power shift transmission selector valve operating through a mechanical linkage connected to the clutch pedal operating the inching valve. The mechanical detent releases in response to a spring in the transmission selector valve spool engaging a cam on the clutch pedal of the inching valve which permits the selector valve to return to the low speed position when the inching valve is operated.

10 Claims, 2 Drawing Figures

MECHANICAL DETENT FOR THREE SPEED POWER SHIFT TRANSMISSION

This invention relates to a hydraulic valve and more particularly to a mechanical detent release in the selector valve of a power shift transmission which operates in response to operation of the inching valve clutch pedal to assure that the selector valve will be in the low range when the inching valve is operated.

Tractors with multiple speed power shift transmissions have hydraulically actuated clutches which may be selectively shifted by manual means. The pressure of the fluid supplied to the plurality of hydraulic actuators for the clutches may be automatically modulated to provide decay in pressure of the disengaging clutch and pressure buildup in the engaging clutch for smooth transmission of power.

It is, also, desirable to control the flow of pressurization of fluid manually for inching of the vehicle forwardly. During inching, the modulating of the fluid pressure of the hydraulic fluid supplied to the hydraulic actuator of a clutch is manually throttled as it passes through the valve to the hydraulic actuator. Accordingly, it is desirable to shift the vehicle transmission to its lowest speed range to provide smooth starting of the vehicle.

Accordingly, this invention provides a means whereby the inching, responsive to the operator's manual control, down shifts the selector valve for the power shift transmission from a stationary position. By mechanically releasing the selector valve detent through a cam on the clutch pedal of the inching valve, a biasing means shifts the power shift transmission selector valve to the low range.

Accordingly, it is an object of this invention to provide a mechanical detent release in a hydraulic transmission selector valve responsive to a camming device connected to the inching valve clutch pedal.

It is another object of this invention to provide a mechanical detent release on a manually operated clutch pedal of an inching valve to control the release of the detent mechanism in a power shift transmission to down shift the transmission to the low range during inching operation.

It is a further object to provide detents in all positions when the selector valve is manually operated.

It is a further object of this invention to provide a mechanical detent release on a selector valve of a power shift transmission allowing the valve spool of the selector valve to shift relative to the detent elements in response to operation of a manually operated inching valve.

It is a further object of this invention to provide a manually operated plunger in a transmission selector valve operating responsive to manual movement of an inching valve to bias the plunger for release of the plunger and detent elements in the transmission valve of a selector valve of a power shift transmission.

The objects of this invention are accomplished by providing an inching valve connected in series with a speed selector valve in a hydraulic circuit. The clutch pedal operating the inching valve is provided with a camming means which operates a detent plunger on the speed selector valve to release the valve detent allowing a biasing means to shift the speed range selector valve to the low range position to assure inching in the low range position. The plunger which engages the camming means on the clutch pedal operates through a spring to release detent elements which normally engage selected annular grooves in the spool of the selector valve to release the spool allowing the spool to return to the low range position and assure that inching of the vehicle will be accomplished in the low speed range.

Referring to the drawings, the preferred embodiment of this invention is illustrated.

Figure 1:
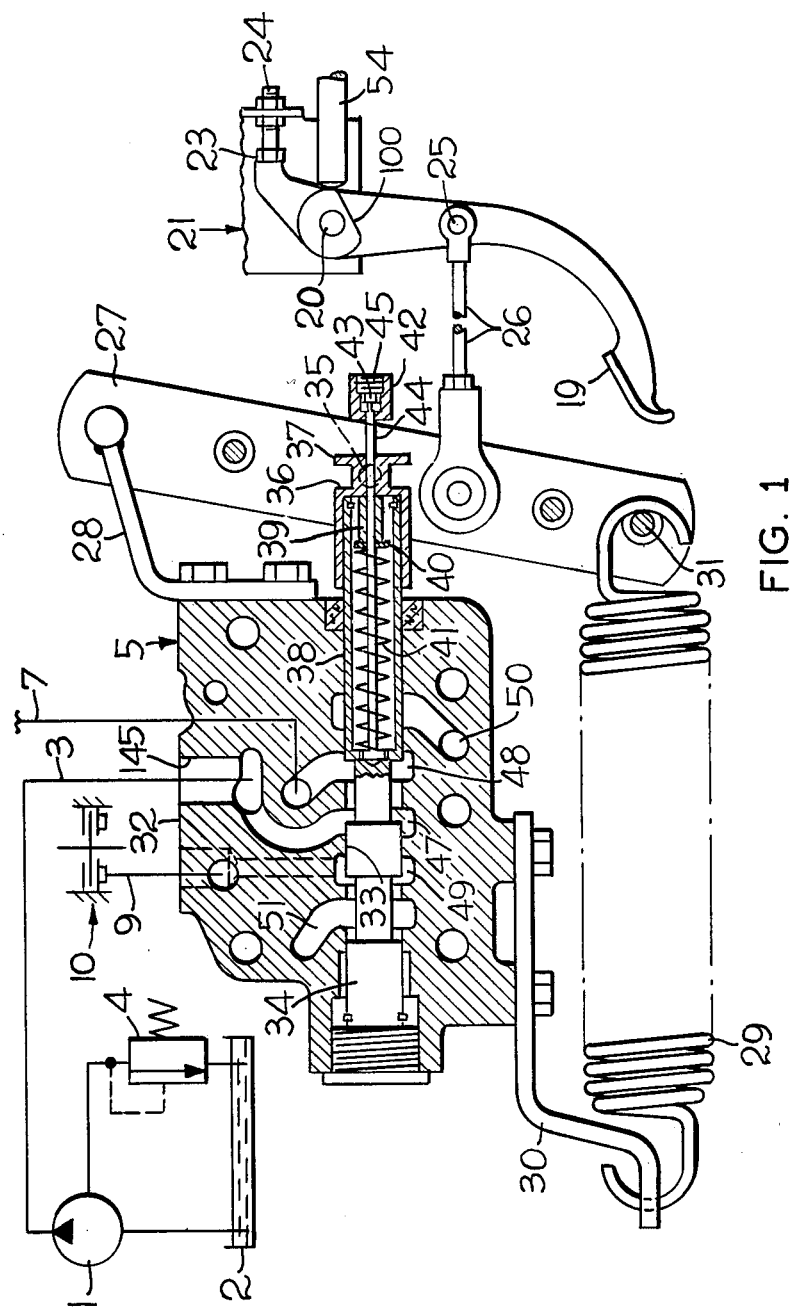
FIG. 1 is a cross section view of the inching valve and the clutch pedal for manually operating the inching valve.

Referring to drawings, the pump 1 receives fluid from the reservoir 2 and pressurizes fluid in conduit 3. A relief valve 4 is connected to the conduit 3 to bypass excess fluid to sump 2 and relieves excess pressure in the circuit.

The pump 1 supplies pressurized fluid to the inching valve 5 which is manually operated. The inching valve 5 controls the flow of pressurized fluid through the conduit 7 which feeds into a spool valve forming the speed range selector valve 8. The inching valve also controls the flow of pressurized fluid through conduit 9 which operates the transmission brake 10.

The speed range selector valve 8 controls the flow of pressurized fluid to the conduits 11, 12 and 13 which respectively supply pressurized fluid to the clutches 14, 15 and 16.

The detent mechanism 17 also defines the three positions of the selector valve and the plunger 54 which is operated by the clutch pedal 19 is shown on the left hand end of the selector valve 8. A manual means 75 is also shown on the selector valve 8 for selectively positioning the valve in any one of the clutch operating positions.

The clutch pedal 19 is pivotally supported on the pin 20 on the vehicle chassis 21. A return spring 29 returns the clutch pedal 19 to the return stop 23 defined by the bolt 24 fastened to the vehicle chassis.

The clutch pedal 19 is pivotally connected by a pin 25 to the link 26. Link 26 is pivotally connected to the lever 27 which is pivotally supported on the bracket 28. The return spring 29 supported on bracket 30 and connected through pin 31 to lever 27. The inching valve 5 includes a housing 32 defining a central bore 33 for receiving the spool 34. When the clutch pedal 19 is in the clutch engaging position as shown in FIG. 1, the lever 27 is also returned in response to the biasing force of the spring 29. The pins 35 of which one is shown, is aligned with the annular recess 36 in the cap 37. The cap 37 encircles the sleeve portion 38 of spool 34. The bushing 39 and washer 40 carried on bolt 44 engage the spring 41 with the spring 41 compressed within the sleeve 38 of spool 34. The cap 42, which receives the nut 43, threadedly engaging the end of the bolt 44. The screw 45 is screwed into the cap 42 to trap the end of the bolt 44. The spool assembly moves as a unit with lever 27 until the throttling edges of the spool engage the lands and then relaxes spring 41 thereby reducing pressure until it engages cap 42 when pressure is 0.

The inlet passage 145 is in communication with the conduit 3 and supplies pressurized fluid to the inlet chamber 47 which encircles the central bore 33. The clutch actuating chamber 48 encircles the central bore 33 and is in communication with the conduit 7 to supply pressurized fluid to the control valve 8 in the clutch actuating position shown in FIG. 1. Sump chamber 51 is connected to the brake chamber 49 when the clutch is engaged. When the clutch pedal 19 is depressed, the inlet chamber 47 is connected to the brake actuating chamber 49 to operate the transmission brake 10. In this position, the clutch chamber 48 is in communication with sump chamber 50. Inching is provided by throttling fluid to the clutch actuating chamber 48 manually when actuating pedal 19.

Figure 2:
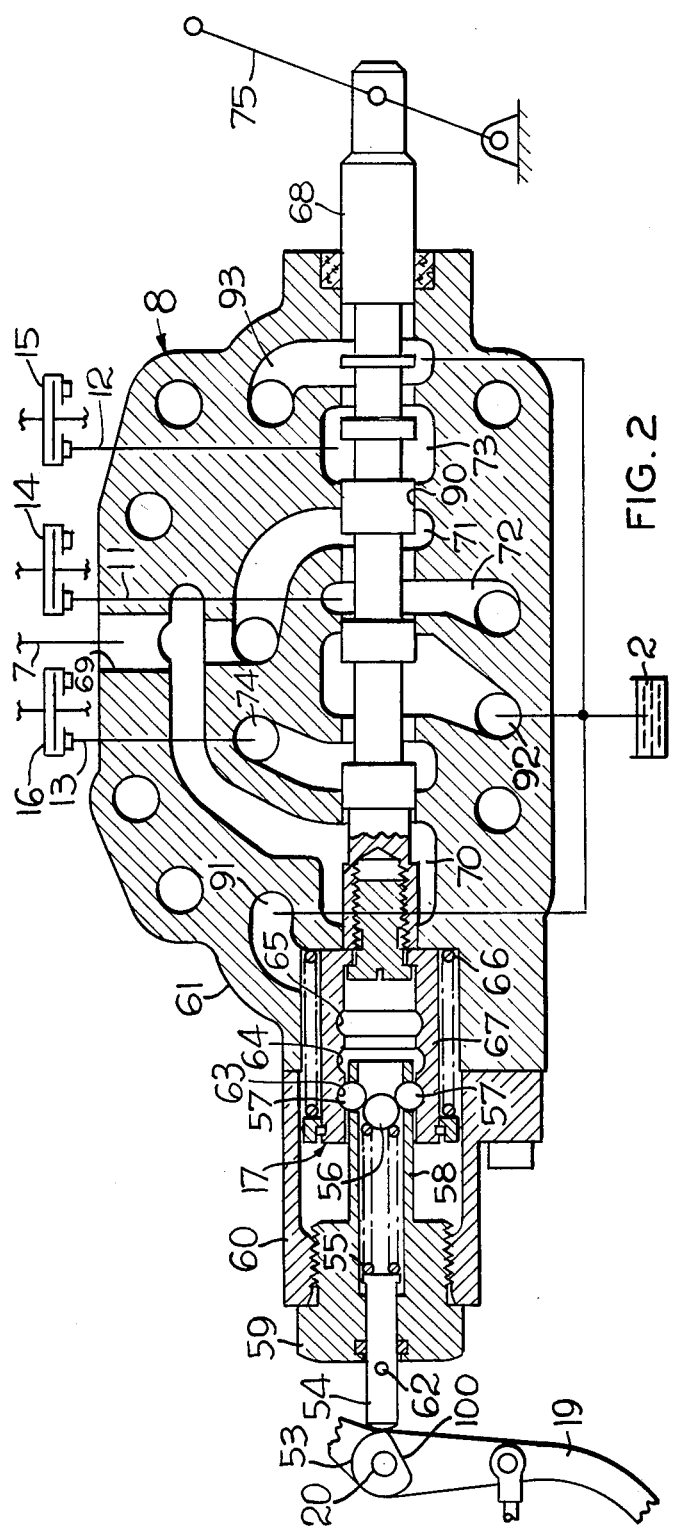
FIG. 2 is a cross section view of the speed range selector valve with a manual control for operating the valve and the clutch pedal with camming means for operating the detent mechanism when the inching valve is operated.

Referring to FIG. 2, the speed range selector valve 8 is shown in cross section.

The pedal 19 carries a cam 53 operating the plunger 54 against the biasing force of the spring 55 which actuates the detents 57. The pin 62 limits the right hand movement of plunger 54. The spring 55 biases the ball 56 which operates as a camming element against the detent elements 57 carried in radial openings 157 of the detent sleeve 58 of the cap 59. The cap 59 threadedly engages the end of the casing 60 which is fastened to the housing 61 of the selector valve 8. The detent sleeve 67 is fastened to the spool 68 to form a tubular end and defines the annular grooves 63, 64 and 65. The return spring 66 biases the detent sleeve 67 and the spool 68 in bore 90 to a return position in the left hand direction toward the low speed range. The inlet passage 69 is in communication with the conduit 7 which in turn is connected to inching valve 5. The selector valve is shown in the high position for driving the transmission in the high speed range with the inlet chamber 71 in communication through the high speed range chamber 72 to the hydraulic actuator of the high speed clutch 14. The inlet chamber 71 can be selectively connected to the intermediate clutch chamber 73 and the low speed clutch chamber 74. Sump chambers 91, 92 and 93 are connected to cylindrical opening 90. Inching valve 5 is operated when the pedal 19 is depressed rotating the cam 53 which in turn releases the plunger 54 allowing the detented mechanism 17 to release. Release of the detented mechanism 17 will allow the return spring 66 to return the spool 68 to the low position in which the inlet chamber 70 is in communication with the low clutch chamber 74 and the detents 57 are received in the annular groove 65.

The operation of the device will be described in the following paragraphs.

The pump 1 pressurizes fluid in the conduit 3 and supplies pressurized fluid to the inching valve 5. When the pedal is depressed, the communication is interrupted and pressurized fluid is supplied to the transmission brake 10. The transmission selector valve 8, if not in the low position, will automatically shift to the low position. Supplying pressurized fluid to the transmission brake 10 slows the rotation of the transmission components and allows a mechanically shifted range transmission, not shown, to be shifted. The brake may be fully actuated when the pedal is down to stop rotation in the transmission entirely if desired.

Normally, the power shift transmission can be shifted while the vehicle is moving. The transmission selector valve 8 can be manually shifted by the lever 75 between the low, intermediate and high ranges by movement of the lever 75 when the pedal 19 is in the clutch engaging position. For inching of the vehicle, the pedal 19 is operated which in turn throttles the flow of pressurized fluid to the transmission selector valve 8. Throttling of the fluid reduces the pressure of the fluid supplied to the clutch. Inching is normally provided for starting the vehicle moving from a stopped position. The selector valve is in the low range position when the spool is in the left hand position. As the pedal 19 is depressed, the plunger 54 is allowed to move against the cam surface 100 permitting the plunger 54 to reduce the force on the spring 55. This in turn allows the camming ball 56 to release the force on the detent elements 57 which in turn permits the detent elements to move radially inward from the recess grooves in the sleeve 67. With the release of the detent elements 57 from the sleeve 67, the return spring 66 biases the spool 68 in the left hand direction to the low speed range position in which the detent elements are received within the annular recess 65. When the selector valve 8 is in the low speed range, the pedal 19 throttles the fluid supplied to the selector valve 8 allowing manual modulation of the fluid and partial slipping of the clutch to inch the vehicle forward.

The embodiments of the invention in which an exclusive property or privilege is claimed are defined as follows:

1. A detent mechanism in a hydraulic system comprising, a spool valve including a housing defining a cylindrical opening, a spool having a tubular end defining axially spaced grooves formed therein received in said cylindrical opening, a detent operating mechanism including a detent sleeve mounted on said housing and a detent actuator reciprocally mounted in said sleeve, said detent sleeve defining radial openings receiving detent elements for selective alignment with said grooves in the tubular end of said spool, a return spring means normally biasing said spool to a return position, said detent operating mechanism biasing said detent actuator for camming said detent elements radially outward in said openings of said detent sleeve and selectively in said grooves, said detent operating mechanism selectively releasing said detent elements from said grooves allowing said return spring to return said spool to the return position.

2. A detent mechanism in a hydraulic system as set forth in claim 1 wherein said detent actuator extends from said housing and is adapted for operation by an external manually operated means.

3. A detent mechanism in a hydraulic system as set forth in claim 1 wherein said detent elements define spherical members.

4. A detent mechanism in a hydraulic system as set forth in claim 1 wherein said detent actuator includes a spring normally biasing said detent elements.

5. A detent mechanism in a hydraulic system as set forth in claim 1 wherein said tubular end of said spool defines a spring seat, said return spring means compressively positioned between said housing and said spool to return said spool to the return position.

6. A detent mechanism in a hydraulic system as set forth in claim 1 wherein said axially spaced grooves define annular grooves.

7. A detent mechanism in a hydraulic system as set forth in claim 1 wherein said detent operating mechanism includes a lever carrying a cam element releasing said detent actuator to release said detent elements.

8. A hydraulic system for a power shift transmission including, a pump, a speed range selector valve, an inching valve for manually modulating pressurized fluid from said pump to said speed range selector valve, said selector valve including a housing defining a cylindrical opening, a spool having a tubular end reciprocally mounted in said cylindrical opening, said tubular end defining a plurality of axially spaced grooves, resilient means normally biasing said spool to a return position, a detent mechanism including a detent sleeve mounted on said housing defining radial openings for selective alignment with said grooves in said spool, a detent actuator reciprocally mounted in said detent sleeve, camming means mounted in said detent sleeve, a plurality of detent elements mounted in said radial openings of said detent sleeve whereby said camming means normally biases said detent elements for selective positioning in selected of said grooves, a lever for actuating said inching valve including a cam element for releasing said detent actuator to allow said return spring to return said spool to the return position when said inching valve is operated.

9. A hydraulic system for a power shift transmission as set forth in claim 8 including a cam on said lever for biasing said detent actuator to allow said detent mechanism to release said spool whereby said return spring returns said spool of said selector valve to the return position when said lever is actuated.

10. A hydraulic system for a power shift transmission as set forth in claim 8 including a cam on said lever engaging said detent actuator, said cam releasing said detent actuator to release said detent elements allowing said selector valve spool to return to a low speed range position when said inching valve is operated.

* * * * *